(12) United States Patent
Heimsoth

(10) Patent No.: US 7,249,672 B2
(45) Date of Patent: Jul. 31, 2007

(54) DEVICE FOR CONTINUOUSLY DELIVERING BAGS

(75) Inventor: Andreas Heimsoth, Walsrode (DE)

(73) Assignee: Fresenius Kabi Deutschland GmbH, Bad Homburg V.D.H (DE)

( * ) Notice: Subject to any disclaimer, the term of this patent is extended or adjusted under 35 U.S.C. 154(b) by 0 days.

(21) Appl. No.: 10/540,960

(22) PCT Filed: Dec. 20, 2003

(86) PCT No.: PCT/EP03/14699

§ 371 (c)(1),
(2), (4) Date: Mar. 21, 2006

(87) PCT Pub. No.: WO2004/058604

PCT Pub. Date: Jul. 15, 2004

(65) Prior Publication Data

US 2006/0207861 A1    Sep. 21, 2006

(30) Foreign Application Priority Data

Dec. 30, 2002  (DE) ................. 102 61 707
Dec. 8, 2003    (DE) ................. 103 57 227

(51) Int. Cl.
    *B65G 19/22*  (2006.01)
(52) U.S. Cl. ................... 198/727; 198/726; 198/604
(58) Field of Classification Search ............. 198/717,
    198/721, 726, 727, 604, 606, 607
    See application file for complete search history.

(56) References Cited

U.S. PATENT DOCUMENTS

| 1,680,888 A | * | 8/1928 | Kluck | ................. | 198/727 |
| 3,052,343 A | * | 9/1962 | Schreyer | ................. | 198/726 |
| 3,191,748 A | * | 6/1965 | Martin | ................. | 198/726 |
| 3,245,518 A | * | 4/1966 | Reibel et al. | ................. | 198/727 |

(Continued)

FOREIGN PATENT DOCUMENTS

DE    604249    10/1934

(Continued)

OTHER PUBLICATIONS

International Search Report for PCT/EP2003/014699 (in English and German).

(Continued)

*Primary Examiner*—James R. Bidwell
(74) *Attorney, Agent, or Firm*—Proskauer Rose LLP

(57) ABSTRACT

A device for continuously delivering bags includes at least one bag transferring device and at least one linear conveyor. The bag transferring device transfers the bags to the at least one linear conveyor. An objective of the invention is to provide a device for delivering bags, which ensures a continuous subsequent processing of the bags at a high rate and with a high degree of reliability. To this end, the device includes a continuously operating linear conveyor with bag holding fixtures. The width of the bag holding fixtures, in the direction of conveyance, is greater than the width of the bags to be held. This enables the linear conveyor to avoid having to be stopped during the delivery of the bags by the bag transferring device, and a continuous delivery of the bags to a next bag handling device can be ensured.

14 Claims, 3 Drawing Sheets

Figure 1:
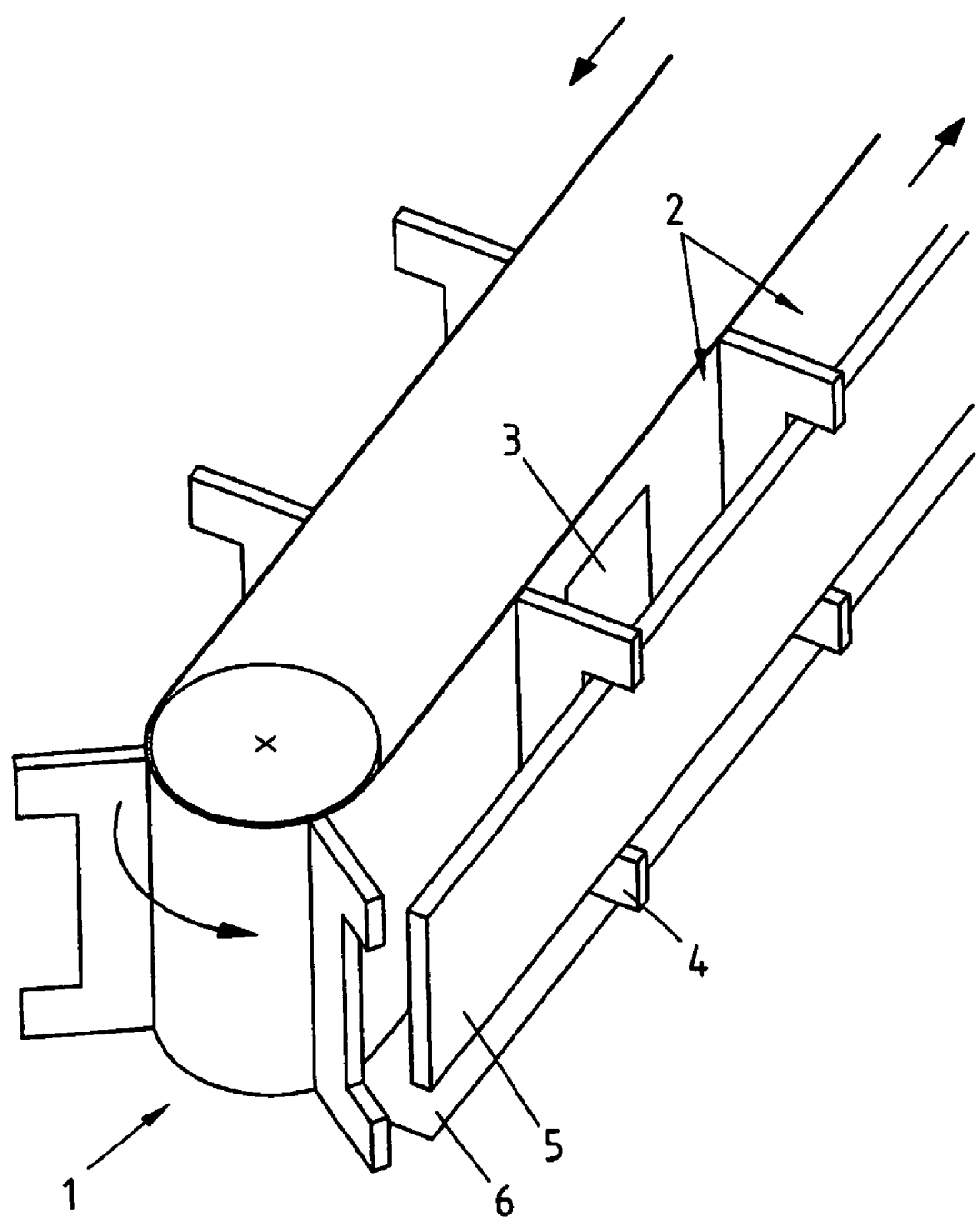

U.S. PATENT DOCUMENTS 3,332,533 A * 7/1967 Del Rossi ................... 198/726
4,228,888 A    10/1980 Bruno ........................ 198/461

FOREIGN PATENT DOCUMENTS

| DE | 198 13 120 A1 | 7/1999 |
| DE | 199 18 476 A1 | 10/2000 |
| DE | 101 27 109 B4 | 12/2002 |
| EP | 1 035 023 A1 | 9/2000 |
| EP | 1 043 233 A1 | 10/2000 |
| WO | 01/85544 | 11/2001 |
| WO | WO 01/85544 | 11/2001 |

OTHER PUBLICATIONS

International Preliminary Examination Report for PCT/EP2003/014699 (in German).

\* cited by examiner

DEVICE FOR CONTINUOUSLY DELIVERING BAGS

The present invention relates to a device for the continuous delivery of bags with at least one bag transfer device and at least one linear conveyor, whereby the bag transfer device transfers the bags to at least one linear conveyor.

In the sense of this invention the bags are understood to be in particular standing bags but also e.g. simple bags or bags with lateral folds. Such bags are used increasingly for packaging in the areas of food or non-food, and this as much for liquid or at least partially liquid filling goods as well as for pourable filling goods. The device according to the invention for the continuous delivery of bags is intended to be used within installations and processes for the filling of bags ensuring high filling frequencies. Such a device and corresponding process are also described for example in patent application PCT/EP00/04541 of the applicant.

Devices for the filling of bags that have been known for a longtime from the state of the art function in cycles and therefore offer only low filling frequencies of approximately 20 to 30 bags per minute, contrary to the continuously operating devices for the filling of e.g. glass or polyethylene bottles.

By comparison, known devices for the filling of e.g. glass or polyethylene bottles are able to achieve filling frequencies of 1000 containers and more per minute. Due to the fact that these high filling frequencies could not be reached until now in filling bags the utilization of bags is limited at this time essentially to products that are not produced in very high-scale production.

Because of the low filling frequencies attainable at this time with the conventional bag filling devices, the problem arises that installations which in addition to the filling and closing of the bags also make the production of the bags possible have hardly found any applications so far. This is due to the fact that machines for the production of bags of high quality have high requirements regarding the mechanical equipment and thereby require investments that as a rule can be justified economically only if the bags are produced at very high frequency. In time this leads to the devices for the filling of bags to be operated with bags produced elsewhere which are merely filled and closed in the known bag filling devices affording only low frequencies.

In order to ensure the high filling frequencies mentioned with a bag filling device it is necessary for the bags to be supplied with sufficient rapidity and reliability and to be conveyed at the necessary speed individually to the continuous process of further treatment. For this purpose PCT/EPO/04541 discloses for example that the flat bags are taken from a hopper or from an installation for the production of the bags and are deposited in stacking carriers suitable to receive a great number of stacked, flat bags. These stacking carriers are conveyed by a conveyor, preferably a single conveyor with intercalation of buffers, to a device for the removal and marshalling into singles of the bags coming from these stacking carriers.

The taking of the bags from the stacking carriers by means of a device taking separate bags for itself has proven to be neither sufficiently reliable nor fast enough.

In addition tests were conducted with a device for the taking and marshalling into singles of bags from stacking carriers with at least one removal station taking the bag stacks from the stacking carriers, with at least one feeder station equipped with a hopper, a pocket element and a belt conveyor, whereby every pocket of the pocket element is assigned a feeder station and the belt conveyor is located between the feeder stations and the pocket element. As the bags are marshaled into singles by means of the feeder station the bags are conveyed by the opened belt conveyor into the pockets of the pocket element, whereupon the belt conveyor closes, the pocket element then opens and the bags seized by the belt conveyor are finally transferred from the area of the pocket element to downstream belt conveyors. However the transfer continues to be in cycles due to the opening and closing process of the belt conveyor, so that a continuous delivery of bags ensuring a very high processing frequency can still not be achieved.

According to the invention, the previously stated and explained problem is solved in that a continuously operating linear conveyor with bag receivers is provided, and in that the width of the bag receivers is greater in conveying direction than the width of the bags to be received.

The bag transfer device transfers the bags to the linear conveyor in which it conveys the bags into the bag receivers. The expanded bag receivers ensure in that case that the bag transfer device is able to transfer the bags to the continuously operating linear conveyor without having to stop the linear conveyor. By taking into account the distance covered by the linear conveyor during the transfer of the bags by the bag transfer device, a continuous delivery of bags by the linear conveyor, e.g. to a downstream bag treatment device, can easily be ensured.

In a first embodiment of the device according to the invention of a device for the continuous delivery of bags, bag receivers can be made available in an especially simple manner in that the bag receivers are attached to the linear conveyor or possess elements that are formed on the linear conveyor. Here two adjoining receiving elements constitute one bag receiver to receive the bags from the bag transfer device by means of which the bags are conveyed by the linear conveyor. It is however also possible to imagine receiving elements capable of receiving one bag at a time.

The linear conveyor is provided preferably with at least one lateral and/or lower guide rail to guide the bags, so that especially simple receiving elements attached to the linear conveyor or formed on the linear conveyor, e.g. receiving elements with a simple rectangular cross-sectional surface, can be used for the bag receivers. In this case a bag is displaced e.g. by the receiving elements in conveying direction on the lower guide rail and is supported by the lateral guide rail if applicable.

According to a further developed embodiment of the device according to the invention for continuous delivery of bags, secure transfer and secure conveying of the bags in the bag receivers can be ensured in that the receiving elements are provided with at least one opening in the cross-sectional surface perpendicular to the conveying direction and in that at least one opening is adapted on a lateral guide rail. Receiving elements of this kind make it possible for the lateral guide rail to extend within the opening of the receiving elements without the occurrence of a vertically extending gap between lateral guide rail and receiving elements. This effectively prevents jamming of the bags in the area of the lateral guide rail.

The number of the bags that can be delivered per time unit can be further increased in that a second continuously operating linear conveyor with bag receivers is provided and in that the two linear conveyors are across from and parallel to each other. Especially fast bag transfer devices can thus transfer the bags simultaneously to two linear conveyors without great expenses. In addition such a design makes it possible for both linear conveyors to utilize a lateral and/or lower guide rail.

Optimized transfer of the bags from a bag transfer device to a linear conveyor as well as from the linear conveyors across from each other to a downstream linear conveyor following the device according to the invention in conveying direction can be ensured in that the linear conveyors across from each other converge conically in conveying direction. On the one hand a greater distance between the bag transfer devices results in the area of bag transfer by a bag transfer device, so that these can e.g. be placed across from each other. On the other hand the interval between the conveyed bags becomes minimal in the area of the outlet of the linear conveyors across from each other, so that the transfer to a linear conveyor downstream of the device according to the invention is improved. To make this possible it is of course necessary that the preferably C-shaped receiving elements be provided with an opening of sufficient depth.

The width of the bag receivers is preferably greater than or equal to the double width of the bags to be received, so that receiving elements of one linear conveyor divides the bag receivers of the other linear conveyor into two halves of at least the width of the bags in the area of the end of the linear conveyors across from each other. As a result the bags can be transferred to a downstream linear conveyor in as close a succession as possible.

In general the processing capacity of the individual linear conveyors is greater than that of the bag transfer devices that transfer the bags, so that in order to increase the number of delivered bags a plurality of bag transfer devices are preferably provided. These can be placed e.g. next to each other and/or across from each other. Here it is also possible for the bag transfer devices to be offset and across from each other and/or above each other, e.g. because of lack of space.

If, according to another embodiment of the device according to the invention for continuous delivery of bags, the bag transfer devices are provided with a feed station having a hopper, then the device according to the invention is adapted in a simple manner to the device known from the state of the art for taking bags out of the stacking carriers and marshalling them into singles.

An especially economical embodiment of the device according to the invention for continuous delivery of bags is achieved in that at least one belt conveyor is provided as linear conveyor. Belt conveyors, especially when toothed belts are used, are not only inexpensive to manufacture but also afford the required precision and solidity for the transportation of the bags.

A great number of possibilities exist to design and further develop the device according to the invention for continuous delivery of bags. In this respect the claims following claim 1 should be mentioned on the one hand, and on the other hand the description of preferred examples of embodiments in combination with the drawing. In the drawing FIG. 1 shows a first embodiment of a device according to the invention for continuous delivery of bags in perspective, FIG. 2 shows a second embodiment of the device with two linear conveyors across from each other at the moment of bag transfer, in perspective, FIG. 3 also shows a perspective view of the embodiment of FIG. 2 upon completed bag transfer and FIG. 4 shows a third embodiment of the device according to the invention with linear conveyors converging conically, as seen from above.

The embodiment of a device according to the invention for continuous delivery of bags comprises a continuously operating linear conveyor 1 with bag receivers 2 to receive the bags 3 transferred from a bag transfer device not shown in FIG. 1. Formed on the bag receivers 2 are receiving elements 4 perpendicular to the conveying direction, whereby every two adjoining receiving elements 4 constitute a bag receiver 2. The distance between the receiving elements 4 which determines the width of the bag receivers 2 in conveying direction is greater than the width of the bags 3 to be received, so that the distance covered by the linear conveyor 1 during the transfer of the bags 3 can be taken into account and the bags 3 transferred discontinuously by the bag transfer device which is not shown can be continuously removed by the linear conveyor 1 and delivered to downstream bag treatment devices.

The receiving elements 4 shown in FIG. 1 have a C-shaped cross-sectional surface perpendicular to the conveying direction so that the lateral guide rail 5 runs in the opening and no straight-line gap occurs between receiving elements and guide rail. This measure prevents in principle the bags 3 to be conveyed between the lateral guide rail 5 and the receiving element from becoming jammed. The bag 3 placed into the bag receiver 2 by the not shown bag transfer device is displaced by means of the linear conveyor 1 on the lower guide rail 6 as FIG. 1 further shows, and is thus conveyed. In order to reduce the friction on the lower guide rail 6 the latter can be made e.g. of polished and/or structured material, e.g. a sheet metal. However other low-friction and low-wear materials can be used for the production of the lower guide rail 6.

Figure 2:
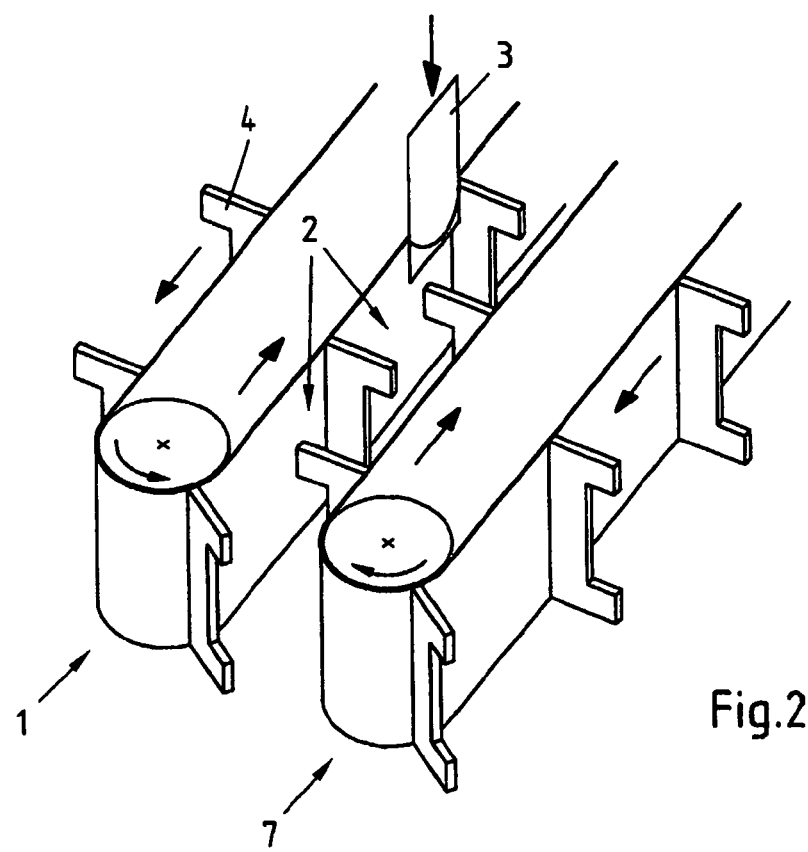
Figure 3:
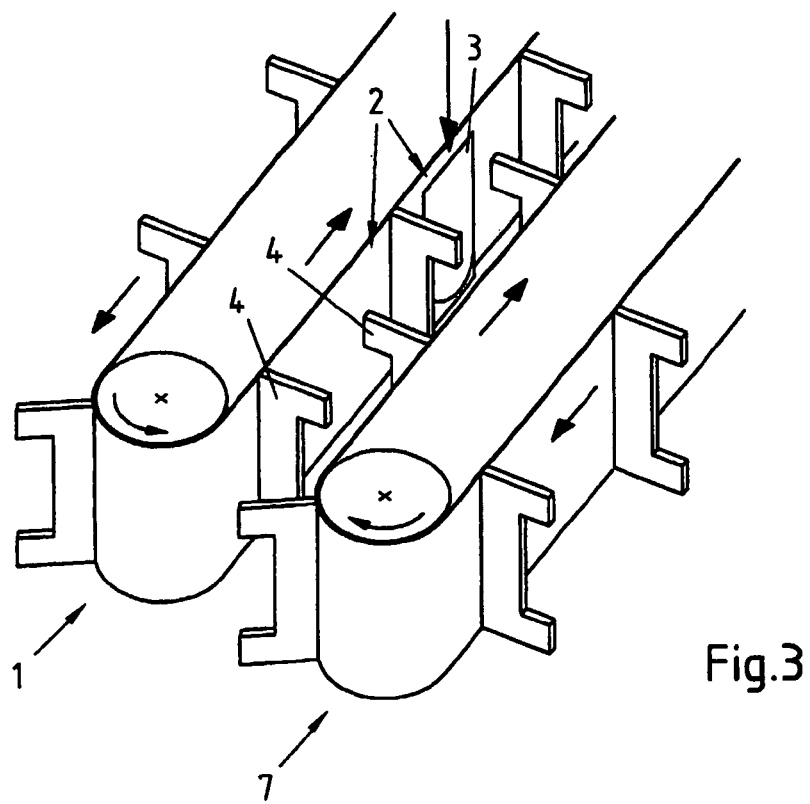
Figure 4:
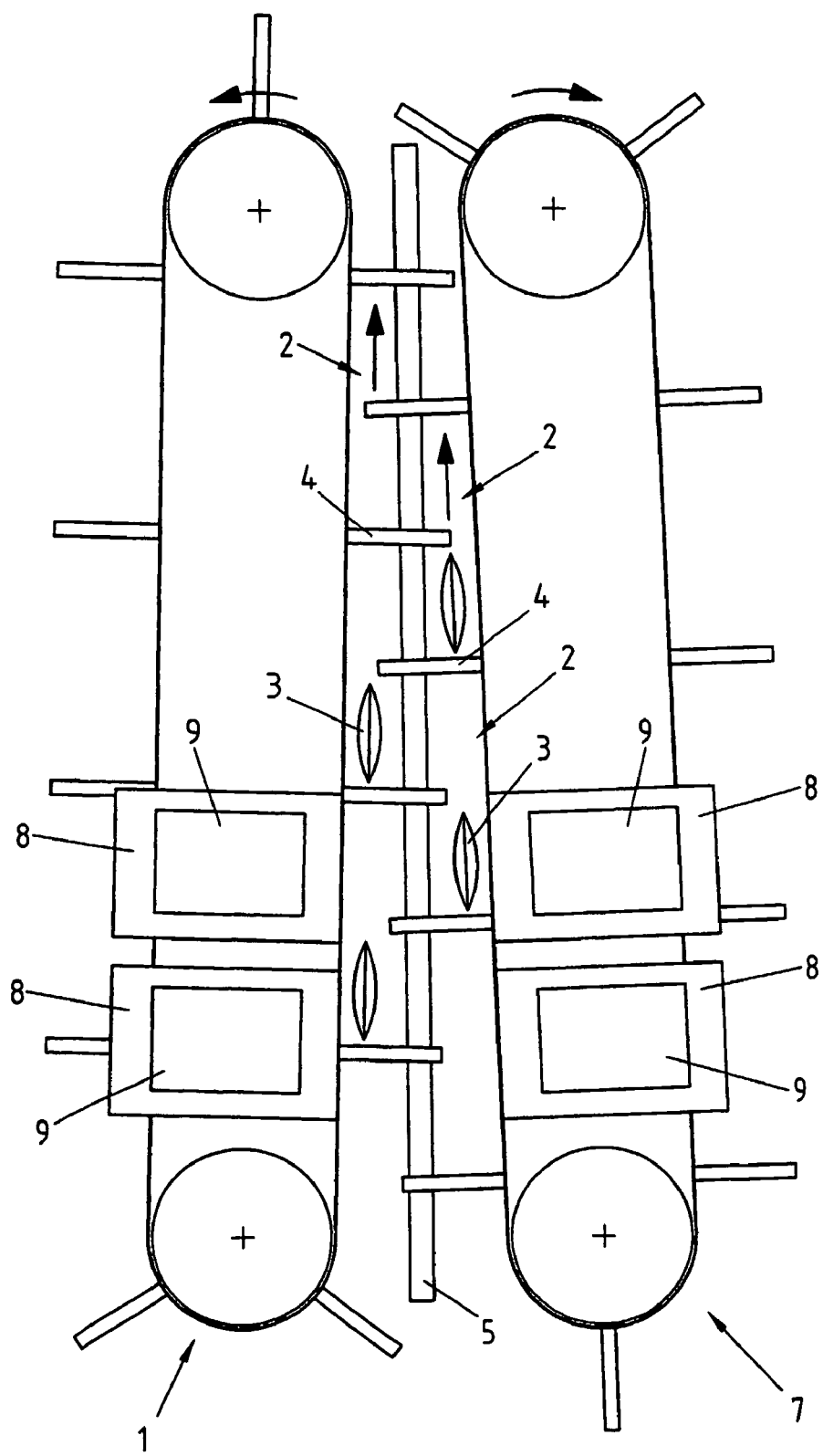

The second embodiment of the device according to the invention for continuous delivery of bags shown in FIGS. 2 and 3 has a second continuously operating linear conveyor 7 in addition to a first linear conveyor 1 which is installed across from and parallel to the first linear conveyor 1. For the linear conveyors 1, 7 belt conveyors are preferably used as these are inexpensive in manufacture and ensure sufficient precision. Adjoining receiving elements 4 formed on the linear conveyor 1, 7 constitute the bag receivers 2 to which the bags 3 are transferred for conveying. For the sake of simplification the optional guide rail 5 between the linear conveyors 1 and 7 is not shown.

FIG. 2 shows the second embodiment of the device according to the invention at the start of transfer of the bag 3 by a not shown bag transfer device to the linear conveyor 1. The lowering of the bag 3 into the bag receiver 2 takes place during continuous operation of the linear conveyors 1 and 7 as soon as an empty bag receiver 2 is underneath the bag 3. The continuous operation of the linear conveyors 1 and 7 is made possible by the greater width of the bag receivers 2 in a conveying direction as compared to the width of the bag 3 to be received. Following the transfer of the bag 3 to the linear conveyor 1 or 7 the bag 3 is located inside the bag receiver 2 at the end opposite to the bag receiver 2 in conveying direction as shown in FIG. 3. By means of the continuously operating linear conveyors 1 and 7 a greater number of bags 3 can now be transferred to an additional bag treatment station not shown here or e.g. to a downstream linear conveyor.

FIG. 4 shows a top view of a third embodiment with conically converging linear conveyors 1, 7 and a total of four bag transfer devices 8 with a feed station 9 equipped with a hopper. The bag transfer devices 8 and the feed stations 9 are shown only schematically in FIG. 4.

As can be seen in FIG. 4, the number of bags 3 that can be conveyed per time unit can be increased and the conveying capacity of the linear conveyors 1, 7 can be fully utilized by providing a greater number of bag transfer devices installed next to each other or, as in the shown embodiment, also across from each other. The feed stations 9 which are equipped with a hopper in conjunction with the bag transfer devices 8 allow on the one hand for continuous delivery of the bags 3 to the linear conveyors 1, 7 at high frequency and on the other hand for easy coupling to the device for taking out the bags 3 and marshalling them into singles.

The linear conveyors 1 and 7 shown in FIG. 4 are placed so as to converge conically in conveying direction so that the formed-on receiving elements 4 are at a greater distance from the laterally guiding guide rail 5 at the start of conveying the bags 3 through the linear conveyors 1, 7 across from each other than at the end of conveying, when the bags 3 are transferred.

In the exit area of the linear conveyors 1 and 7 across from each other the receiving elements 4 divide the bag receiver 2 of each of the linear conveyors 1 and 7 across from each other into two bag receiver halves with a width at least equal to the width of the bags 3, in which one bag at a time is conveyed by one of the linear conveyors 1, 7. As a result the bags 3 are transferred not only with the smallest possible interval between each other but also with a minimal interval in conveying direction, and at a perpendicular to the conveying direction to a linear conveyor downstream of the device according to the invention. Due to the short interval between the bags 3 at a perpendicular to the conveying direction the transfer, e.g. to a downstream linear conveyor not shown here is improved considerably. At the same time the reduction of the interval between the bags 3 in conveying direction maximizes the capacity of the device according to the invention while the speed of the linear conveyors 1, 7 remains unchanged.

The invention claimed is:

1. A device for continuous delivery of bags with at least one bag delivery device and at least one linear continuously operating conveyor, whereby the bag delivery device delivers the bags to at least one linear continuously operating conveyor, and wherein the at least one continuously operating linear conveyor includes bag receivers and a width of the bag receivers is greater in conveying direction than a width of the bags to be received.

2. The device of claim 1, wherein the bag receivers are attached to the at least one linear conveyor or have receiving elements formed on the at least one linear conveyor.

3. The device of claim 1 or 2, wherein the linear conveyor is provided with at least one lateral guide rail guiding the bags.

4. The device of claim 2, wherein the receiving elements are provided with at least one opening in the cross-sectional surface perpendicular to the conveying direction and the at least one opening is adapted to a lateral guide rail.

5. The device of claim 1, wherein a second, continuously operating linear conveyor with bag receivers is provided and the two linear conveyors are installed across from and parallel to each other.

6. The device of claim 5, wherein the two linear conveyors across from each other are laid out so as to converge conically in the conveying direction.

7. The device of claim 5, wherein the width of the bag receivers of the two linear conveyors is greater than or equal to the double width of the bags to be received.

8. The device of claim 1, wherein a plurality of bag transfer devices is provided.

9. The device of claim 8, wherein the plurality of bag transfer devices are provided with feeder stations equipped with a hopper.

10. The device of claim 1, wherein at least one belt conveyor is provided as the at least one linear conveyor.

11. The device of claim 1, wherein the linear conveyor is provided with at least one lower guide rail guiding the bags.

12. The device of claim 5, wherein a plurality of bag transfer devices is provided.

13. The device of claim 12, wherein the plurality of bag transfer devices are provided with feeder stations equipped with a hopper.

14. The device of claim 5, wherein a belt conveyor is provided as the second linear conveyor.

* * * * *

UNITED STATES PATENT AND TRADEMARK OFFICE
CERTIFICATE OF CORRECTION

PATENT NO. : 7,249,672 B2 Page 1 of 1
APPLICATION NO. : 10/540960
DATED : July 31, 2007
INVENTOR(S) : Heimsoth It is certified that error appears in the above-identified patent and that said Letters Patent is hereby corrected as shown below:

Column 5, line 37, claim 1, delete "in conveying direction", insert -- in a conveying direction --

Signed and Sealed this

Twentieth Day of November, 2007

JON W. DUDAS
*Director of the United States Patent and Trademark Office*